US010675949B2

(12) United States Patent
Hipp-Kalthoff et al.

(10) Patent No.: US 10,675,949 B2
(45) Date of Patent: Jun. 9, 2020

(54) EVAPORATOR UNIT FOR A ROOFTOP AIR-CONDITIONING SYSTEM OF A ROAD-GOING VEHICLE

(71) Applicant: Mahle International GmbH, Stuttgart (DE)

(72) Inventors: Christoph Hipp-Kalthoff, Stuttgart (DE); Hans-Henning Knorr, Remshalden (DE); Nayyar Rahman, Stuttgart (DE); Klaus Voigt, Bietigheim-Bissingen (DE)

(73) Assignee: Mahle International GmbH (DE)

( * ) Notice: Subject to any disclaimer, the term of this patent is extended or adjusted under 35 U.S.C. 154(b) by 125 days.

(21) Appl. No.: 15/739,150

(22) PCT Filed: Jun. 13, 2016

(86) PCT No.: PCT/EP2016/063502
§ 371 (c)(1),
(2) Date: Dec. 21, 2017

(87) PCT Pub. No.: WO2016/207010
PCT Pub. Date: Dec. 29, 2016

(65) Prior Publication Data
US 2018/0290520 A1    Oct. 11, 2018

(30) Foreign Application Priority Data

Jun. 23, 2015  (DE) .......................... 10 2015 211 606

(51) Int. Cl.
*B60H 1/32*    (2006.01)
*B60H 1/00*    (2006.01)

(52) U.S. Cl.
CPC ....... *B60H 1/3227* (2013.01); *B60H 1/00335* (2013.01); *B60H 1/00371* (2013.01); *B60H 1/323* (2013.01); *B60H 2001/00235* (2013.01)

(58) Field of Classification Search
CPC .. B60H 1/3227; B60H 1/00335; B60H 1/323; B60H 1/00371; B60H 2001/00235
(Continued)

(56) References Cited

U.S. PATENT DOCUMENTS 6,295,826 B1 * 10/2001 Lee .................... B60H 1/00371
                                                              62/244
6,415,620 B1 *  7/2002 Ferdows ............ B60H 1/00371
                                                              62/244

(Continued)

FOREIGN PATENT DOCUMENTS

CN    104019584 A    9/2014
DE    19505403 A1    8/1996

(Continued)

OTHER PUBLICATIONS

English abstract for DE-19505403.
(Continued)

*Primary Examiner* — Steve S Tanenbaum
(74) *Attorney, Agent, or Firm* — Fishman Stewart PLLC

(57) ABSTRACT

An evaporator unit for a rooftop air-conditioning system of a vehicle may include a housing having two evaporators. Each evaporator may include a plurality of evaporation pipes running parallel to one another and parallel to a Z axis of the evaporators, a distributor and collector box running parallel to an X axis of the evaporator, and a diverting box running parallel to the X axis of the evaporator. The distributor and collector box may include an inlet connector for liquid refrigerant and an outlet connector for gaseous refrigerant that may be disposed adjacent to one another on a same face side of the distributor and collector box and in a Y axis of the evaporator. The two evaporators may be disposed on both sides of an intake chamber of the evaporator unit and may lay opposite one another in a transverse axis of the (Continued)

evaporator unit. The evaporators may be structurally identical.

20 Claims, 5 Drawing Sheets

(58) Field of Classification Search
USPC .......................................................... 62/526
See application file for complete search history.

(56) References Cited

U.S. PATENT DOCUMENTS

| | | | |
|---|---|---|---|
| 2010/0024458 A1 | 2/2010 | Schmitt et al. | |
| 2010/0031698 A1* | 2/2010 | Higashiyama | ........ F25B 39/028 62/525 |
| 2013/0067946 A1* | 3/2013 | Higashiyama | .......... F25B 39/02 62/288 |

FOREIGN PATENT DOCUMENTS

| | | |
|---|---|---|
| DE | 202008002054 U1 | 4/2008 |
| DE | 102006047367 B4 | 1/2009 |
| DE | 102009056968 B3 | 3/2011 |
| DE | 102012018272 A1 | 3/2014 |
| DE | 102012216039 A1 | 5/2014 |
| EP | 0802383 A2 | 10/1997 |
| JP | H09-86153 A | 3/1997 |
| WO | WO-2014205799 A1 | 12/2014 |

OTHER PUBLICATIONS

English abstract for DE-102012018272.
English abstract for CN-104019584.
English abstract for DE-102012216039.
English abstract for DE-102009056968.
English abstract for JP-H09-86153.

* cited by examiner

EVAPORATOR UNIT FOR A ROOFTOP AIR-CONDITIONING SYSTEM OF A ROAD-GOING VEHICLE

CROSS-REFERENCE TO RELATED APPLICATIONS

This application claims priority to International Application PCT/EP2016/063502 filed on Jun. 13, 2016, and to German Application DE 10 2015 211 606.9 filed on Jun. 23, 2015, the contents of each of which are hereby incorporated by reference in their entirety.

The present invention relates to an evaporator unit for a rooftop air-conditioning system of a road-going vehicle. The invention relates furthermore to a rooftop air-conditioning system equipped with such an evaporator unit for a road-going vehicle.

TECHNICAL FIELD

Air-conditioning systems to air-condition a vehicle interior are generally known. Such an air-conditioning system operates with at least one refrigeration circuit, in which a refrigerant circulates and in which at least one evaporator for evaporating the refrigerant, at least one condenser for condensing the refrigerant and at least one conveying device for driving the refrigerant in the refrigerant circuit are arranged. Usually, in addition, at least one expansion valve is present, in order to control the inflow of the pressurized, liquid refrigerant to the evaporator. By means of the evaporator, which is configured as a heat exchanger, an air flow can be cooled, which is to be delivered to the vehicle interior which is to be air-conditioned. The heat extracted here from the air flow can be delivered via the condenser for example to an environment of the vehicle. Expediently, for this, the condenser is also configured as a heat exchanger, which is flowed through for example by a cooling air flow which takes up the heat.

Whereas in passenger cars the air-conditioning systems are usually integrated into the vehicle, in large-capacity vehicles, such as for example in utility vehicles, buses and suchlike, an external arrangement is also possible, namely preferably on a vehicle roof. This part of the air-conditioning system, mounted on the vehicle roof, is designated as a rooftop air-conditioning system.

Such a rooftop air-conditioning system comprises at least one evaporator unit, which has at least one evaporator in a housing. The housing can have here for example a lower housing part and an upper housing part. In the housing, in addition, at least one air filter and at least one evaporator blower can be arranged. The respective evaporator of this evaporator unit is, as explained above, integrated into a refrigeration circuit. The associated condenser can basically be arranged at any desired other suitable location of the vehicle. For example, in an engine compartment of the vehicle or respectively in a space of the vehicle in which a main cooler of an engine cooling circuit is also arranged. In particular, the rooftop air-conditioning system can therefore be connected via the refrigeration circuit to a condenser which is already present in any case on the vehicle. In so far as the rooftop air-conditioning system is equipped with its own condenser, it comprises in addition a condenser unit, which has at least one condenser. In addition, a condenser blower can be provided. Expediently, a fan shroud can also be provided, which defines a flow channel which connects the condenser with the condenser blower.

In addition, such a rooftop air-conditioning system can be equipped with a hood, which serves to cover the evaporator unit and, if applicable, to cover the condenser unit.

Such rooftop air-conditioning systems have a comparatively complex structure, so that the effort for the production and mounting of such a rooftop air-conditioning system on the vehicle is comparatively great.

BACKGROUND

A rooftop air-conditioning system for a rail vehicle is known for example from DE 10 2009 056 968 B3. It has a box-shaped housing, in which a plurality of evaporator units and a plurality of condenser units are accommodated, wherein a frame of the housing has inlet openings for the evaporators and inlet openings for the condensers. A cover, placed onto the frame, closes the housing.

Further rooftop air-conditioning systems for road vehicles are known from DE 10 2006 047 367 B4, DE 10 2012 018 272 A1 and from DE 10 2012 216 039 A1. They are respectively distinguished in that two evaporator units are arranged on both sides of a centrally arranged condenser unit, so that the condenser unit is arranged between the two evaporator units, which respect to a transverse direction of the vehicle. In DE 10 2012 216 039 A1, the two evaporator units have respectively a lower housing part, which are respectively added onto a lower housing part, arranged therebetween, of the condenser unit. In DE 10 2006 047 367 B4 the housings for the evaporator units and for the condenser unit are constructed in a modular manner in the longitudinal direction of the vehicle, so that a varying number of intermediate modules can be arranged between two end modules. For this, the base bodies of the housings and the associated flaps for closing the upwardly open base bodies are able to be fixed to one another in the longitudinal direction of the vehicle. From DE 10 2012 018 272 A1 it is known to cover the base bodies of the housings for the evaporator units and the condenser unit by means of hoods, wherein the externally lying hoods of the lateral evaporator units are mounted on the central hood of the middle condenser unit so as to be pivotable about a pivot axis running parallel to the longitudinal axis of the vehicle.

Depending on the required refrigerating capacity, which is to be provided by means of the rooftop air-conditioning system, two or more evaporator units, or two or more evaporators within one evaporator unit, can come into use. It is usual here to arrange two evaporator units symmetrically with respect to a longitudinal axis of the rooftop air-conditioning system or respectively to arrange two evaporators symmetrically with respect to a longitudinal rooftop air-conditioning system, within one evaporator unit.

For example, from DE 20 2008 002 054 U1 a rooftop air-conditioning system is known, in which two evaporator units and one condenser unit are arranged adjacent to one another in a transverse direction of the rooftop air-conditioning system, such that the condenser unit is arranged between the two evaporator units. Each of the two evaporator units is equipped here with an evaporator which extends respectively parallel to a longitudinal direction of the rooftop air-conditioning system. The two evaporators are arranged here in a mirror-symmetrical manner with respect to a vertical plane running parallel to the longitudinal direction of the rooftop air-conditioning system, such that connection lines for the refrigerant are arranged with respect the longitudinal direction of the rooftop air-conditioning system on the same side and likewise in a mirror-symmetrical manner. For this, it is necessary to also configure in a mirror-symmetrical manner the two evaporators which are arranged in a mirror-symmetrical manner.

Accordingly, at least two different versions of the respective evaporator must be provided for such rooftop air-conditioning systems or respectively for the evaporator units thereof. The manufacturing expenditure for this is comparatively great. For example, in a series production, two separate production lines must be operated for the two variants of the evaporators. This applies in particular when the respective evaporator has two rows of evaporation pipes arranged adjacent to one another in the through-flow direction of the air flow, so that these rows of evaporation pipes are flowed through consecutively by the air flow. In addition, in such an evaporator, provision is usually made to connect an inlet connector for the supplying of liquid refrigerant to the one row of evaporation pipes, and to connect an outlet connector for the discharging of gaseous refrigerant to the other row of evaporation pipes. Consequently, the evaporators have preferred through-flow directions for refrigerant and air, in order to arrange them e.g. according to the counter-flow principle or according to the parallel flow principle. If, with two evaporators lying opposite one another, the connectors are then to lie on the same side of the evaporator unit, a mirror-symmetrical arrangement with evaporators of structurally identical form is not possible.

The present invention is concerned with the problem of indicating for an evaporator unit of the type described above, or respectively for a rooftop air-conditioning system equipped therewith, an improved embodiment which is distinguished in particular by reduced manufacturing costs.

According to the invention, this problem is solved by the subject of the independent claim. Advantageous embodiments are the subject of the dependent claims.

SUMMARY

The invention is based on the general idea of configuring the two evaporators with a structurally identical form. Through evaporators of structurally identical form, therefore identical, accordingly the mirror-symmetrical configuration of a variant of the respective evaporator is dispensed with, whereby a significant price advantage results for the respective evaporator. The configuration of the evaporators, coming into use, as identical parts is made possible here by evaporators which each have multiple evaporation pipes running parallel to one another and parallel to a Z axis of the respective evaporator, a distributor- and collector box running parallel to an X axis of the respective evaporator, and a diverting box running parallel to the X axis of the respective evaporator. The evaporation pipes extend here from the distributor- and collector box to the diverting box. It is of particular importance here that the distributor- and collector box has an inlet connector for liquid refrigerant and an outlet connector for gaseous refrigerant, wherein these connectors are arranged on the same face side of the distributor- and collector box, therefore at the same end of the distributor- and collector box with respect to the X axis. In addition, the two connectors are arranged adjacent to one another in a Y axis of the respective distributor. Hereby, inlet connector and outlet connector are arranged immediately adjacent to one another on the respective evaporator, which simplifies the use of identical evaporators with arrangement lying opposite one another. In the housing of the evaporator unit, the two evaporators of structurally identical form are arranged on both sides of an intake chamber of the evaporator unit, and namely such that they lie opposite one another in a transverse axis of the evaporator unit. An air flow which is to be cooled enters into this intake chamber during the operation of the evaporator unit, which air flow then divides and flows through the two evaporators, so that each evaporator cools one of the two partial flows.

It is particularly advantageous here that evaporators with two rows of evaporation pipes can be used, because the connectors are situated adjacent to one another on the face side on the distributor- and collector box and are accordingly easily accessible. Therefore, with both evaporators within the evaporator unit, the same through-flow situation can be realized for air and refrigerant, e.g. both evaporators are arranged according to the parallel flow principle or preferably according to the counter-flow principle.

In an advantageous embodiment, the respective evaporator can have accordingly a row, on the inflow side, of evaporation pipes arranged adjacent to one another in the X axis, and a row, on the outflow side, of evaporation pipes arranged adjacent to one another in the X axis. In addition, the respective evaporator is constructed so that the row on the inflow side and the row on the outflow side are arranged adjacent to one another in the X axis. In the installed state, the row on the inflow side is then facing the intake chamber, whereas the row on the outflow side is facing away from the intake chamber. Accordingly, the descriptions "on the inflow side" and "on the outflow side) refer to the air flow which is to be cooled by means of the respective evaporator and which, for this, flows through the respective evaporator. Here, the two rows of evaporation pipes are flowed through successively by the air flow.

A further development is now particularly advantageous, in which the row on the outflow side is connected to the inlet connector, whereas the row on the inflow side is connected to the outlet connector. Hereby, for the respective evaporator, an arrangement is realized in the air flow, which is to be cooled, according to the counter-flow principle, which in this application realizes a particularly high efficiency for the heat transmission. As the evaporation pipes, furthermore, extend transversely to the air flow, a cross counter-flow arrangement results for the respective evaporator.

In another advantageous further development, the row on the inflow side and the row on the outflow side can be divided in the X axis respectively into at least two groups, which respectively have multiple evaporation pipes arranged adjacent to one another in the X axis. For example, it is conceivable to form two, three or four or more such groups in the respective row. The individual groups are connected to one another within the respective evaporator by means of chambers formed in the distributor- and collector box and in the diverting box, and namely such that the refrigerant, during operation of the evaporator unit, firstly flows within the row, on the outflow side, from the first group of the row on the outflow side connected to the inlet connector, up to the last group of the row on the outflow side, and then flows within the row, on the inflow side, from the first group of the row on the inflow side up to the last group of the row on the inflow side, connected to the outlet connector. Through the division of the two rows into respectively multiple groups, a significantly lengthened flow path results for the refrigerant within the two rows, whereby the dwell time of the refrigerant within the evaporator is accordingly lengthened. Accordingly, the time is also lengthened in which the refrigerant within the evaporator can receive heat from the air flow which is to be cooled. This provision also leads to an increased efficiency of the evaporator.

According to an advantageous embodiment, the two evaporators are arranged turned to one another about a vertical axis of the evaporator unit, so that the inlet connectors and the outlet connectors of the two evaporators are situated, with respect to the vertical axis of the evaporator unit, at the same end of the evaporators and, with respect to a longitudinal axis of the evaporator unit, at different ends of the evaporators. In other words, the connectors for inlet and outlet of the refrigerant lie in the case of both evaporators either respectively above or respectively below. Hereby, a line arrangement for integrating the evaporators into a refrigeration circuit is simplified. Usually, the integration of such an evaporator into the refrigeration circuit takes place via an expansion valve.

In an advantageous further development, the two evaporators can be arranged turned about the vertical axis of the evaporator unit through approximately 180° to one another. In other words, the two evaporators are arranged turned about the vertical axis through approximately 180°±20°, preferably through 180°±10° and in particular through 180° to one another, respectively within the manufacturing tolerances.

In another advantageous further development, the two evaporators can be arranged inclined with their Z axis respectively with respect to the vertical axis. This corresponds to a turning of the respective evaporator about its X axis. For example, such an inclination angle is a maximum of 45°. Hereby, the required overall height of the evaporator unit in the vertical axis can be reduced. Likewise, it is conceivable to align the evaporators with their Z axis parallel to the vertical axis.

In another embodiment, the two evaporators and a longitudinal axis of the evaporator unit can be turned to one another, such that the inlet connectors and the outlet connectors of the two evaporators are situated with respect to a vertical axis of the evaporator unit at different ends of the evaporators and with respect to the longitudinal axis of the evaporator unit at the same end of the evaporators. This provision also leads to a simplified line arrangement for integrating the evaporators into the refrigeration circuit. As the connectors for inlet and outlet of the two evaporators are situated on the same side of the evaporator unit, in particular especially short lines can be realized for the integration of the evaporators on the pressure side into the refrigeration circuit, which reduces the costs which are thereby entailed.

In an advantageous further development, the evaporators can be arranged turned about the longitudinal axis through approximately 180° to one another. In other words, the evaporators are arranged turned about the longitudinal axis through 180°±20°, preferably through 180°±10° and in particular through 180° to one another, respectively within the usual manufacturing tolerances.

In another advantageous further development, the evaporators can be arranged aligned with their Z axis respectively approximately parallel to the vertical axis. Hereby, a particularly efficient through-flow of the evaporators results.

In another advantageous embodiment, the evaporators can be arranged with their X axis respectively inclined to the longitudinal axis. For example, an angle between the X axis of the respective evaporator and the longitudinal axis of the evaporator unit is a maximum of 30°. Through this provision, the dimension of the evaporator unit can be reduced in its longitudinal axis.

Another embodiment proposes providing a shared expansion valve for both evaporators, the liquid connector of which on the evaporator side is connected via inlet lines to the inlet connectors of the two evaporators, and the gas connector of which on the evaporator side is connected via outlet lines to the outlet connectors of the two evaporators. Through the use of a shared expansion valve, a simplified line arrangement is possible for the integration of the two evaporators into the refrigeration circuit. With a shared expansion valve, in particular also a spatial arrangement of the expansion valve within the evaporator unit can be realized largely independently of the spatial arrangement of the evaporators.

However, an alternative embodiment is preferred, in which each evaporator has a separate expansion valve, the liquid connector of which on the evaporator side is connected via an inlet line to the inlet connector of the respective evaporator, and the gas connector of which on the evaporator side is connected via an outlet line to the outlet connector of the respective evaporator. The use of such separate expansion valves for each evaporator makes it possible to configure as short as possible the necessary connecting lines, which connect the connectors of the expansion valve on the evaporator side to the connectors of the evaporator. This is advantageous, because the refrigeration circuit is under pressure, so that these connecting lines must be configured so as to be accordingly pressure-stable.

Advantageously, provision can be made that the respective expansion valve is arranged substantially centrally with respect to the Z axis of the respective evaporator. Hereby, a certain symmetry results, which simplifies the ability of the evaporators to be turned about the longitudinal axis. In addition, shortened lines are produced.

Optionally, provision can be made that the respective expansion valve projects in the transverse axis over the associated evaporator exclusively on the inflow side facing the intake chamber. This provision also leads to shortened line lengths.

Furthermore, provision can be made optionally that at the respective evaporator the inlet line and the outlet line extend in an inclined manner with respect to the Z axis of the respective evaporator. In particular, provision can be made that the inlet line and the outlet line are inclined with respect to the Z axis of the respective evaporator so that the associated expansion valve at the respective evaporator is arranged offset in the direction to the inflow side of the respective evaporator. Here, also, short line lengths are facilitated.

Optionally, provision can be made that the respective expansion valve is aligned with its longitudinal axis substantially parallel to the transverse direction. This also simplifies the ability of the evaporator to be turned about the longitudinal axis.

The phrases "substantially centrally" or "substantially parallel" are intended to include deviations from the phrases "centrally" or respectively "parallel", which occur within production with usual manufacturing tolerances. In particular, deviations of ±10% and preferably of ±5% are to be thereby included.

In an advantageous further development, the respective expansion valve can have a control head, which is arranged on the face side on a valve housing of the expansion valve with respect to a longitudinal direction of the expansion valve. The liquid connector and the gas connector are arranged here adjacent to one another on the valve housing in said longitudinal direction of the expansion valve. In addition, the expansion valve is arranged with its longitudinal direction inclined by a maximum of 90° with respect to the vertical axis of the evaporator unit.

For an embodiment in which separate expansion valves are provided, and in which the evaporators are turned to one another about the vertical axis of the evaporator unit, an inclination angle of between 0° and 90°, preferably between 15° and 75°, in particular between 30° and 60°, between the longitudinal direction of the expansion valve and the vertical axis of the evaporator unit is preferred. For an embodiment in which separate expansion valves are provided for the two evaporators and in which the two evaporators are turned to one another about the longitudinal axis of the evaporator unit, an inclination angle of 90° between the longitudinal direction of the respective expansion housing and the vertical axis of the evaporator unit is preferred, wherein this angle is to be understood within manufacturing tolerances. Hereby, on turning of the evaporators about the longitudinal axis of the evaporator unit through 180°, the substantially horizontal alignment of the expansion valve is maintained.

In another advantageous further development, the inlet line and the outlet line can consist of metal, so that they position the expansion valve relative to the evaporator. Hereby, the respective evaporator forms together with the associated separate expansion valve an assembly which can be pre-assembled. At the same time, it is achieved that with a mirror-image arrangement of the evaporators, not only structurally identical evaporators, but also structurally identical assemblies can be used, which promotes the series production of the evaporator unit or respectively of the rooftop air-conditioning system equipped therewith.

The evaporator unit can have further components such as, for example, an evaporator blower and/or air filter. Expediently, for each evaporator in each case an evaporator blower and in each case an air filter are provided.

The X axis, the Y axis and the Z axis of the respective evaporator span a Cartesian coordinate system, in which the individual axes run perpendicularly to one another. The longitudinal axis, the transverse axis and the vertical axis of the evaporator unit span a Cartesian coordinate system, in which the individual axes run perpendicularly to one another. In an exceptional vase, the coordinate systems of the evaporators can be aligned parallel to one another. In a further exceptional case, the coordinate systems of the evaporators can be aligned parallel to the coordinate system of the evaporator unit. In installed state of the rooftop air-conditioning system, the longitudinal axis of the evaporator unit preferably extends parallel to a longitudinal axis of the vehicle, therefore horizontally. The transverse axis of the evaporator unit then extends parallel to a transverse axis of the vehicle, therefore also horizontally. The vertical axis of the evaporator unit then extends parallel to a vertical axis of the vehicle, therefore vertically.

A rooftop air-conditioning system according to the invention, which is provided for a use on a roof of a road-going vehicle, comprises at least one evaporator unit of the type described above. Furthermore, a refrigeration circuit is provided, into which the two evaporators of the evaporator unit are integrated. Expediently, the two evaporators can be coupled via this refrigeration circuit to at least one condenser. Optionally, the rooftop air-conditioning system can have, furthermore, at least one condenser unit, which comprises said condenser, which is accordingly likewise integrated into the refrigeration circuit. Such a condenser unit can have further components. For example, a condenser blower can be provided. Likewise, a fan shroud can be provided, which defines a flow path from the condenser to the condenser blower. The rooftop air-conditioning system can be equipped in addition with a compressor, which can be accommodated e.g. in the evaporator unit or in the condenser unit.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
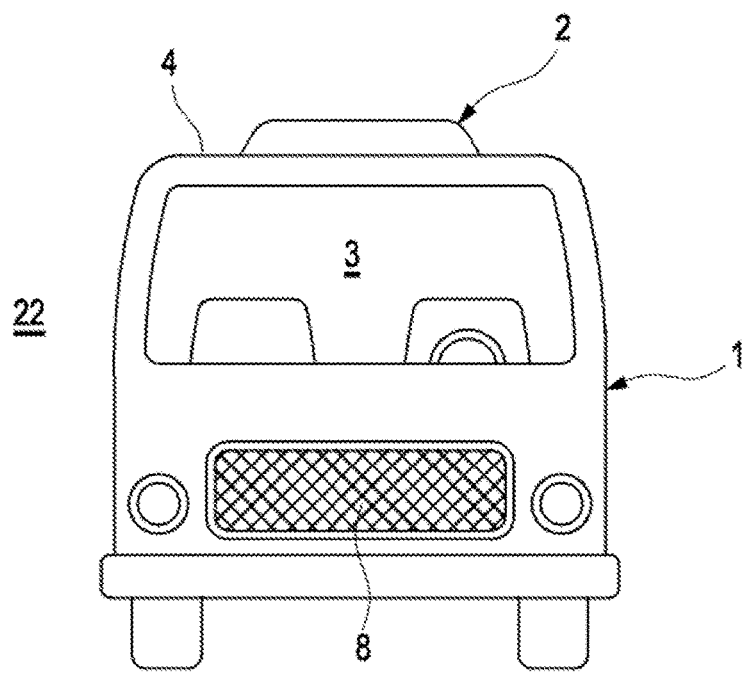
FIG. 1 a highly simplified front view of a vehicle with a rooftop air-conditioning system, FIG. 2 an exploded, isometric view of the rooftop air-conditioning system, FIG. 3 an isometric view of an evaporator of an evaporator unit of the rooftop air-conditioning system, FIG. 4 a top view onto the evaporator unit in a first embodiment, FIG. 5 a simplified top view as in FIG. 4, but in a variant of the evaporator unit, FIG. 6 a simplified side view of the evaporator unit, FIG. 7 a top view onto the evaporator unit in a second embodiment, FIG. 8 a simplified top view onto a variant of the evaporator unit of FIG. 7, FIG. 9 a simplified side view of the evaporator unit of FIG. 7.

According to FIG. 1, a road-going vehicle 1, which in the example shown is a bus, can be equipped with a rooftop air-conditioning system 2, by means of which a passenger compartment 3 is to be cooled. For this, the rooftop air-conditioning system 2 is mounted on a roof 4 of the vehicle 1.

Figure 2:
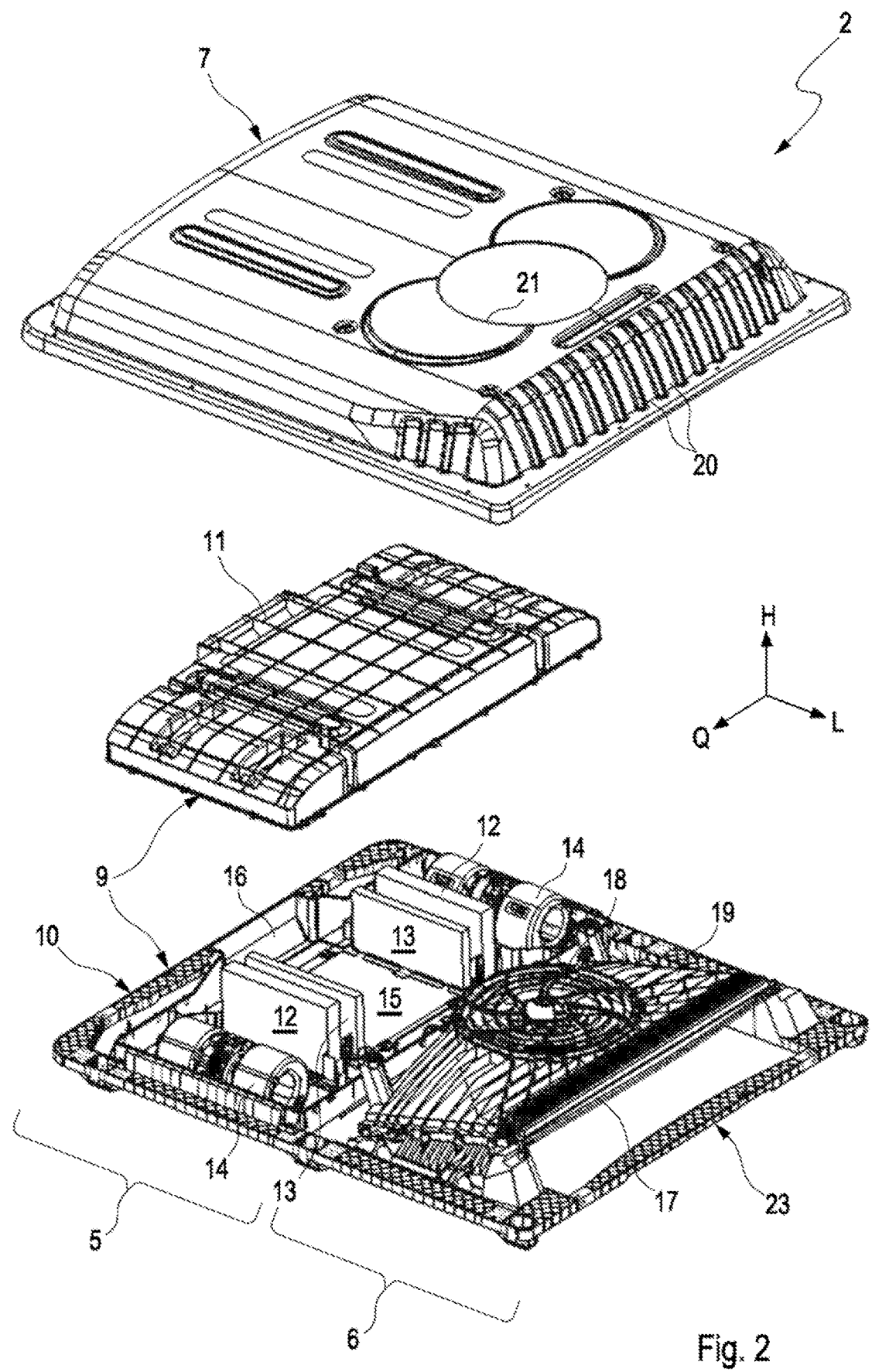

According to FIG. 2, such a rooftop air-conditioning system 2 comprises an evaporator unit 5 and a condenser unit 6, which are coupled to one another via at least one refrigeration circuit, not shown here. In addition, a hood 7 is provided, which in the mounted state on the vehicle roof 4 covers jointly the evaporator unit 5 and the condenser unit 6. Basically, however, an embodiment for such a rooftop air-conditioning system 2 is also conceivable, which does without its own condenser unit 6. In this case, the hood 7 then covers only the evaporator unit 5. In such a case, the evaporator unit 5 is coupled via said refrigeration circuit to another condenser, which can be arranged for example in an equipment compartment 8 or engine compartment 8 of the vehicle 1, indicated in FIG. 1.

The evaporator unit 5 comprises a housing 9, which in the example shown has a lower housing part 10 and an upper housing part 11. In the housing 9, two evaporators 12 are arranged, which are integrated into the said refrigeration circuit. There is associated with each evaporator 12 an air filter 13 and respectively an evaporator blower 14. In addition, an intake chamber 15 is situated in the housing 9, into which intake chamber air can enter from the vehicle interior 3 through an inlet opening 16 formed in the lower housing part 10. The evaporator blowers 14 draw this air out from the intake chamber 15 through the air filters 13 and through the evaporators 12 and convey the air through outlet openings, not shown here, likewise provided in the lower housing part 10, back into the vehicle interior 3. The respective evaporator 12 therefore has an inflow side 47 for air, facing the intake chamber 15, and an outflow side 48 for air, facing away from the intake chamber 15.

The condenser unit 6 comprises a condenser 17 and a condenser blower 18 and a fan shroud 19. The fan shroud 19 defines a flow channel between the condenser 17 and the condenser blower 18. In addition, in the example both the condenser 17 and also the condenser blower 18 are fastened to this fan shroud 19. The hood 7 has an air inlet 20, which leads to the inlet side of the condenser 17, and an air outlet 21, which is arranged at the outlet side of the condenser blower 18. The hood 7 can have in addition a fresh air inlet opening, which can not be seen here, which likewise leads to the intake chamber 15, in order to be able to additionally admix to the air flow, which is to be cooled, fresh air from the environment 22 of the vehicle 1. Alternatively, such a fresh air inlet opening on the hood side can be formed by a gap which, with installed rooftop air-conditioning system 2, is formed between the edge of the hood 7 and the vehicle roof 4.

The air outlet 21 is configured here as a substantially circular opening. Instead of a single air outlet 21, arranged centrally or respectively in the middle, in another, higher-performance embodiment, two air outlets 21 can also be arranged adjacent to one another at the hood 7. In the examples shown, the hood 7 is already prepared for two such air outlets 21 lying adjacent to one another. The corresponding circumferential contours overlap with the created central air outlet 21. For the higher-performance embodiment, to create the two air outlets 21 lying adjacent to one another, these two circumferential contours, instead of the central air outlet 21, are then cut free or stamped free. It is clear that in this higher-performance embodiment, two condenser blowers 18 are then also accordingly provided at the correspondingly adapted fan shroud 19.

The rooftop air-conditioning system 2 has here in addition a frame 23, by means of which the housing 9 can be fastened to the vehicle roof 4 and on which in the example in addition the fan shroud 19 is arranged. Furthermore, the hood 7 can be fastened to this frame 23.

Figure 3:
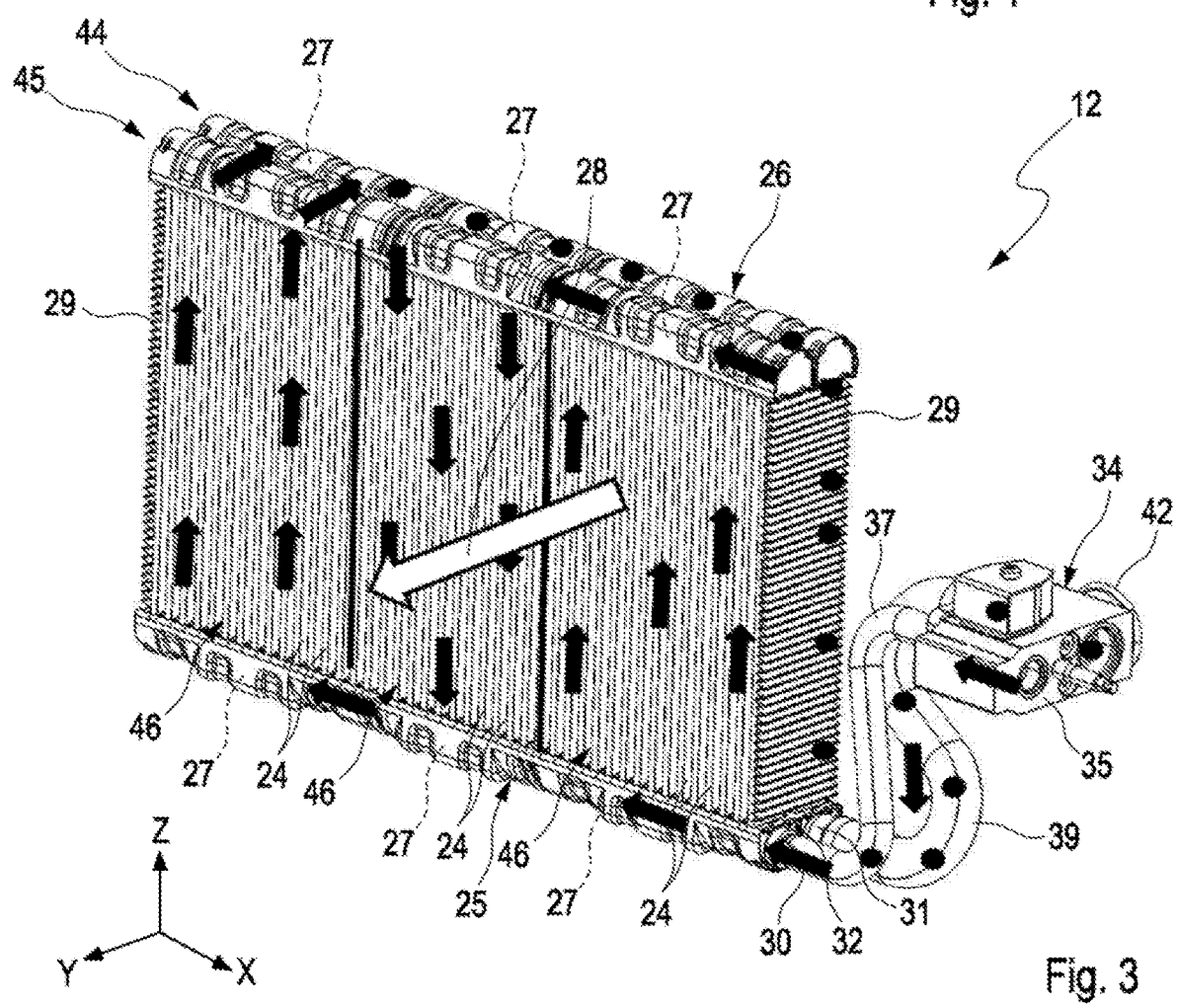

According to FIG. 3, the respective evaporator 12 has multiple evaporation pipes 24 running parallel to one another and parallel to a Z axis Z of the evaporator 12, in which evaporation pipes during operation of the evaporator 12 the evaporating of the refrigerant takes place. The evaporator 12 has in addition a distributor- and collector box 25, which extends parallel to an X axis X of the evaporator 12, and a diverting box 26, which likewise extends parallel to the X axis X. The evaporation pipes 24 extend from the distributor- and collector box 26 to the diverting box 26 and fluidically connect chambers 27 to one another, which can not be seen here, formed in the interior of the distributor- and collector box 25 and in the interior of the diverting box 26. The evaporator 12 is able to be flowed through by the air flow 28, which is to be cooled, in a Y axis Y of the evaporator 12, wherein the air flow 28 flows through with respect to the Z axis Z between the distributor- and collector box 25 and the diverting box 26, and with respect to the X axis X flows through between the individual evaporation pipes 24 and, in so doing, flows around the evaporation pipes 24. In the X axis X, plates 29 and suchlike can be arranged between adjacent evaporation pipes 24, in order to improve the heat transmission between the air flow 28 and the evaporation pipes 24 and therefore to improve the heat absorption into the refrigerant which is directed therein.

The distributor- and collector box 25 has an inlet connector 30 for liquid refrigerant, which is indicated by arrows in FIG. 3, and an outlet connector 31 for gaseous refrigerant, which is indicated by dots in FIG. 3. The inlet connector 30 and outlet connector 31 are arranged here on the same face side 32 of the distributor- and collector box 25. In addition, the inlet connector 30 and outlet connector 31 are arranged adjacent to one another in the Y axis Y on this face side 32. According to FIGS. 2 and 4 to 9, the two evaporators 12 are arranged on both sides of the intake chamber 15 of the evaporator unit 5, and namely so that they lie opposite one another in a transverse axis Q of the evaporator unit 5. In addition, the two evaporators 12 are of structurally identical form. They are therefore able to be identically and readily exchanged for one another.

Figure 4:
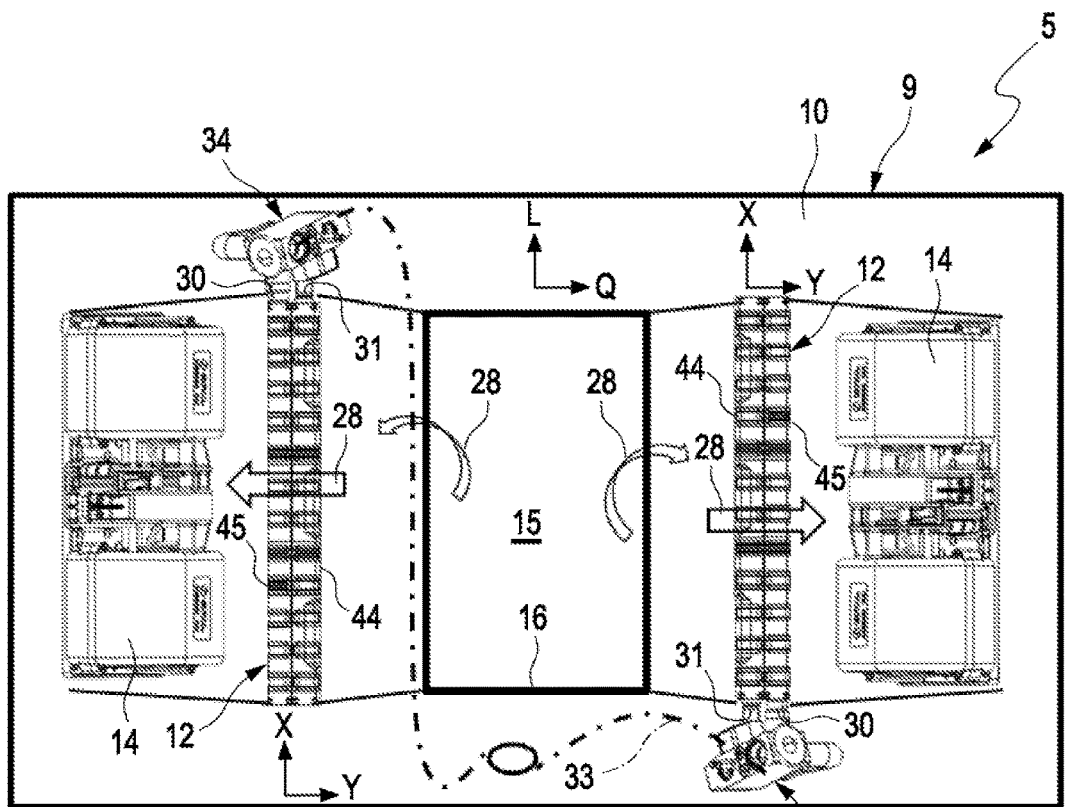
Figure 5:
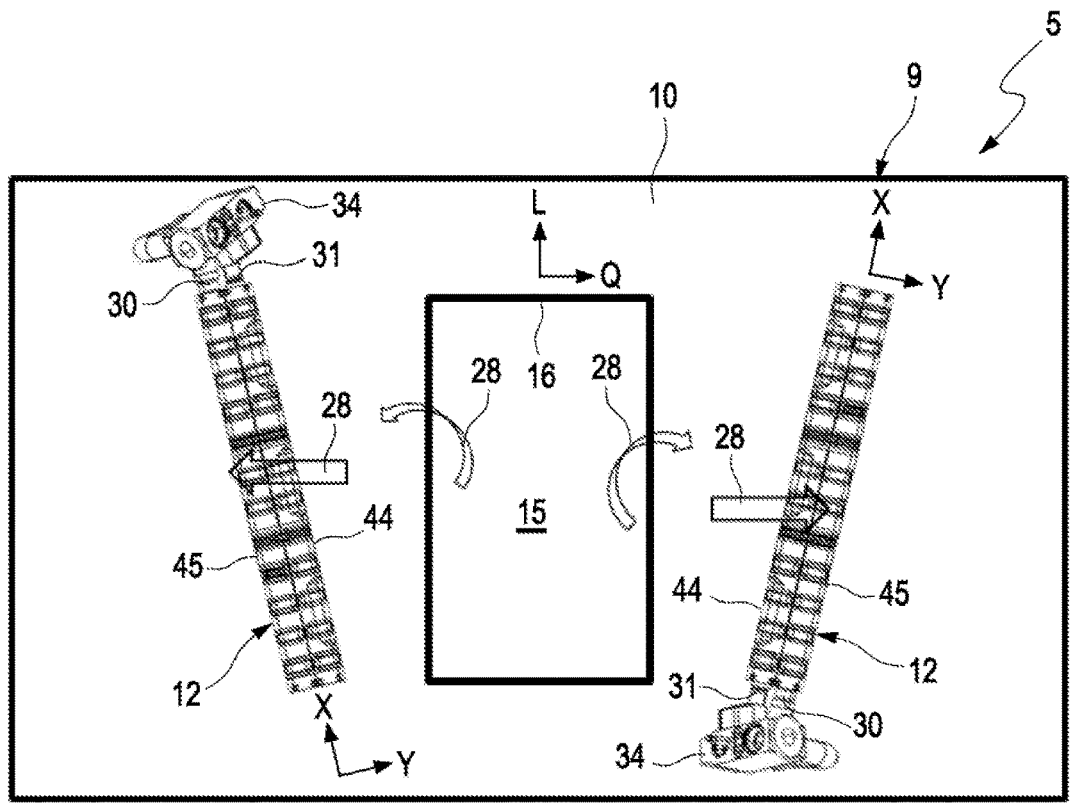
Figure 6:
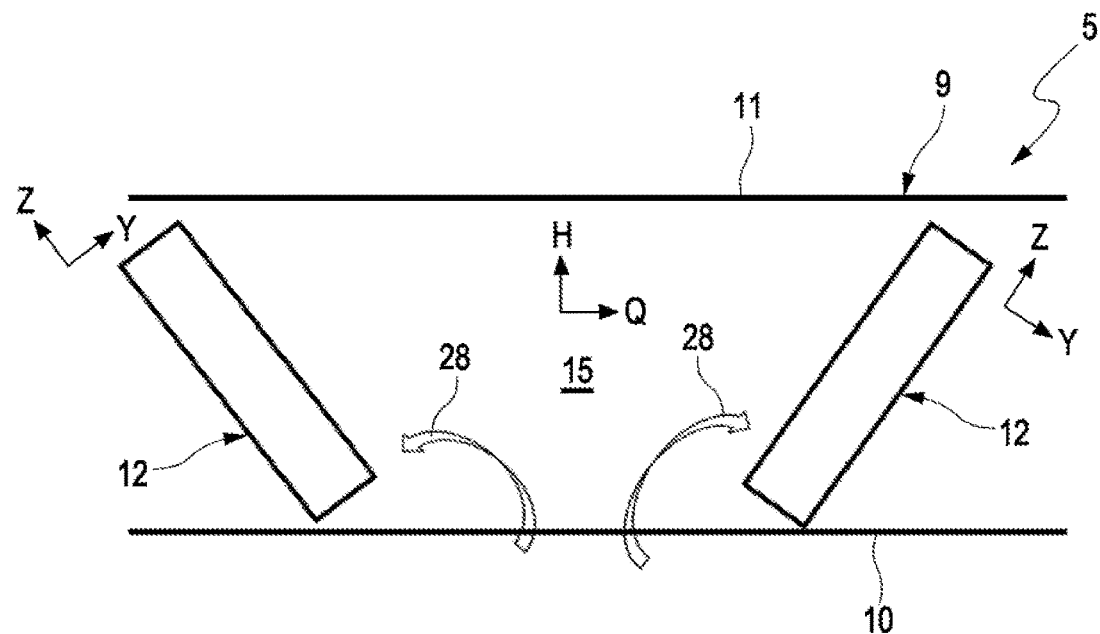

In the first embodiment shown in FIGS. 4 to 6, the two evaporators 12 are arranged in the evaporator unit 5 turned to one another about a vertical axis H, which stands perpendicularly on the plane of drawing in FIGS. 4 and 5. The turned arrangement is achieved in the examples shown in that the two evaporators 12 are arranged turned about said vertical axis H through approximately 180° to one another. In other words, the one evaporator 12 can be carried over into the other evaporator 12 by the rotation about the vertical axis H. This can be seen in that the inlet connectors 30 and the outlet connectors 31 of the two evaporators 12 are situated with respect to the vertical axis H at the same end of the evaporators 12 and with respect to a longitudinal axis L of the evaporator unit 5 are situated at different ends of the evaporators 12. The inlet connectors 30 and the outlet connectors 31 are therefore situated according to FIGS. 4 and 5 either respectively at the upper end of the evaporators 12, facing the observer in FIGS. 4 and 5, or respectively at the lower end of the respective evaporator 12 facing away from the observer in FIGS. 4 and 5. As can be seen, the said connectors 30, 31 with the two evaporators 12 are situated with respect to the longitudinal axis L at opposite sides of the evaporator unit 5 or respectively at opposite ends of the evaporators 12. In the embodiment shown in FIG. 4, the evaporators 12 are arranged within the evaporator arrangement 5 so that the X axes X extend parallel to the longitudinal axis L, and the Z axes Z extend parallel to the vertical axis H. In addition, the Y axes Y extend parallel to a transverse direction Q of the evaporator unit 5. Expediently, the axes X, Y, Z of the respective evaporator 12 stand perpendicularly on one another. Likewise, the axes L, Q and H of the evaporator unit 5 expediently stand perpendicularly on one another.

In the embodiment shown in FIG. 5, the Z axes Z of the evaporators 12 extend parallel to the vertical axis H of the evaporator unit 5, but are turned about the Z axis Z with respect to the evaporator unit 5. Accordingly, an inclination angle, not designated in further detail here, is present between the X axes X and the longitudinal axis L. Likewise, the same inclination angle is present between the Y axes Y and the transverse axis Q.

In FIG. 4 in addition a coupling 33 of the two evaporators 12 is indicated, which is achieved by means of the integration of the two evaporators 12 into the refrigeration circuit, not shown, of the rooftop air-conditioning system 2.

In the embodiment shown in FIG. 6, between the Z axes Z of the two evaporators 12 in addition an inclination angle with respect to the vertical axis H is represented, whereby the overall height of the evaporator unit 5 can be reduced in the vertical axis H. For this, the evaporators 12 are tilted respectively about their X axis X, which in FIG. 6 stands perpendicularly on the plane of the drawing.

Figure 7:
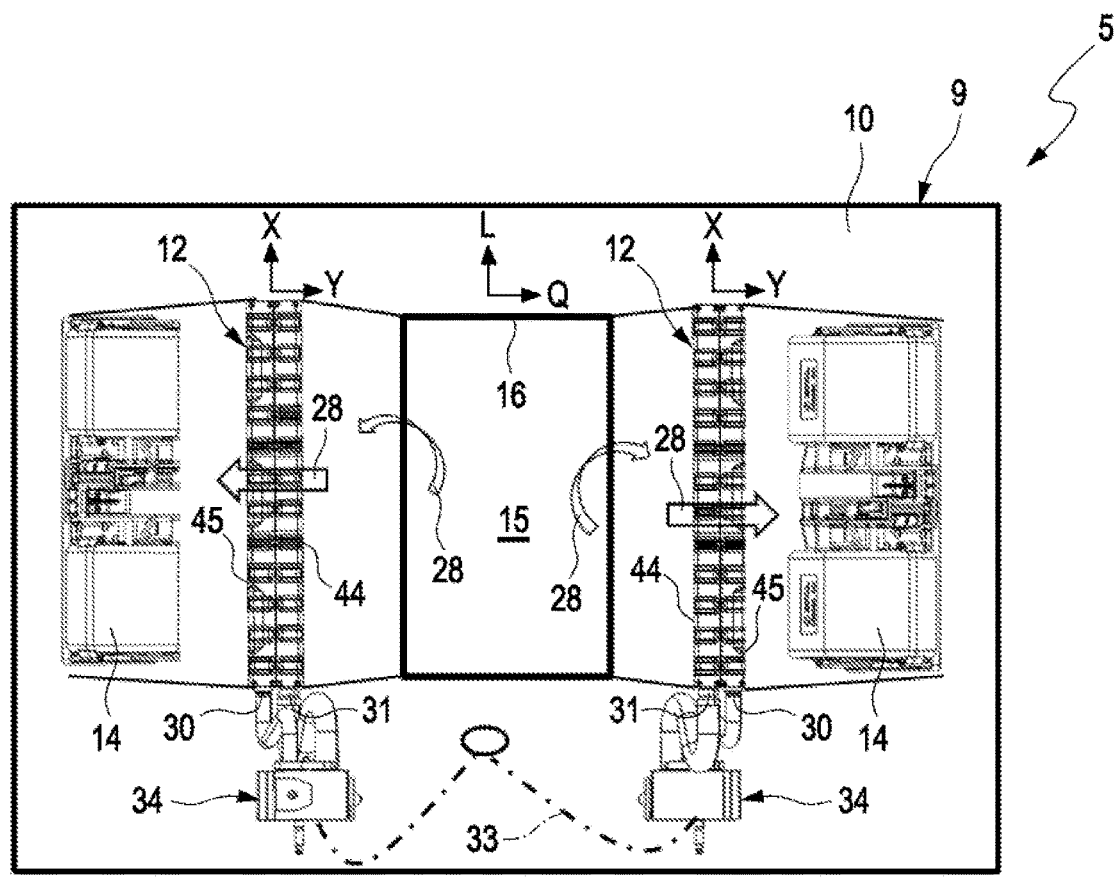
Figure 8:
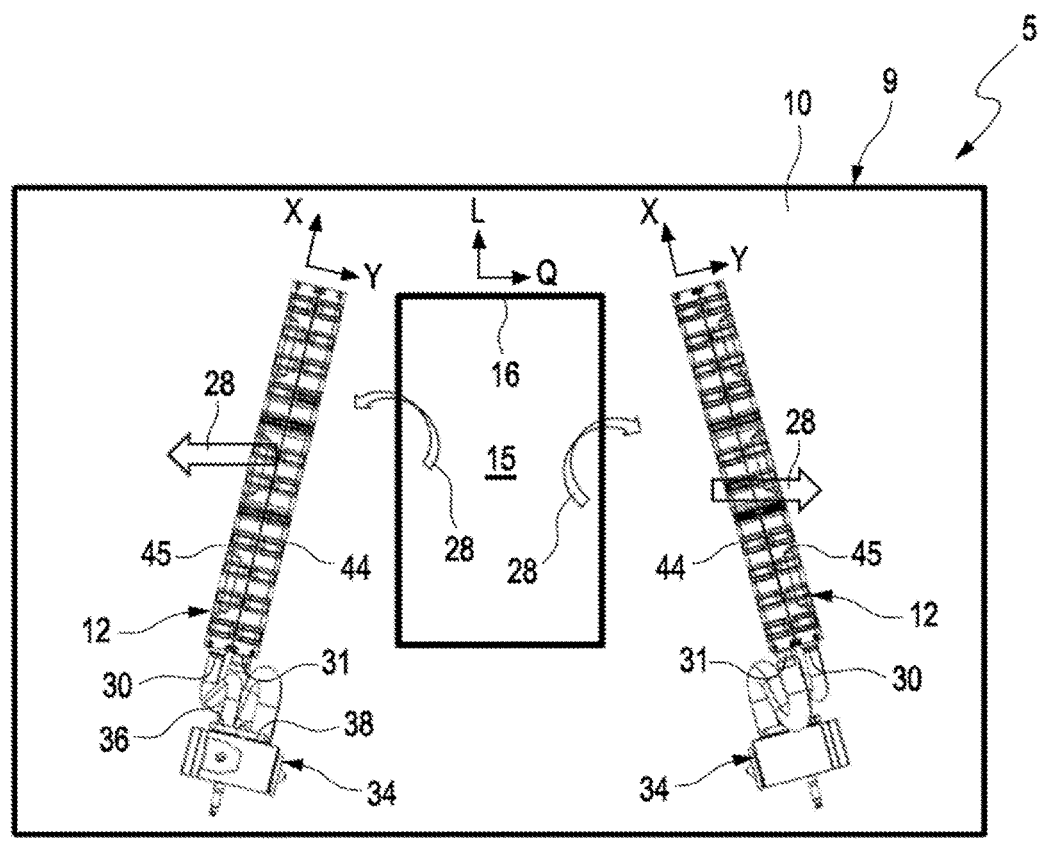
Figure 9:
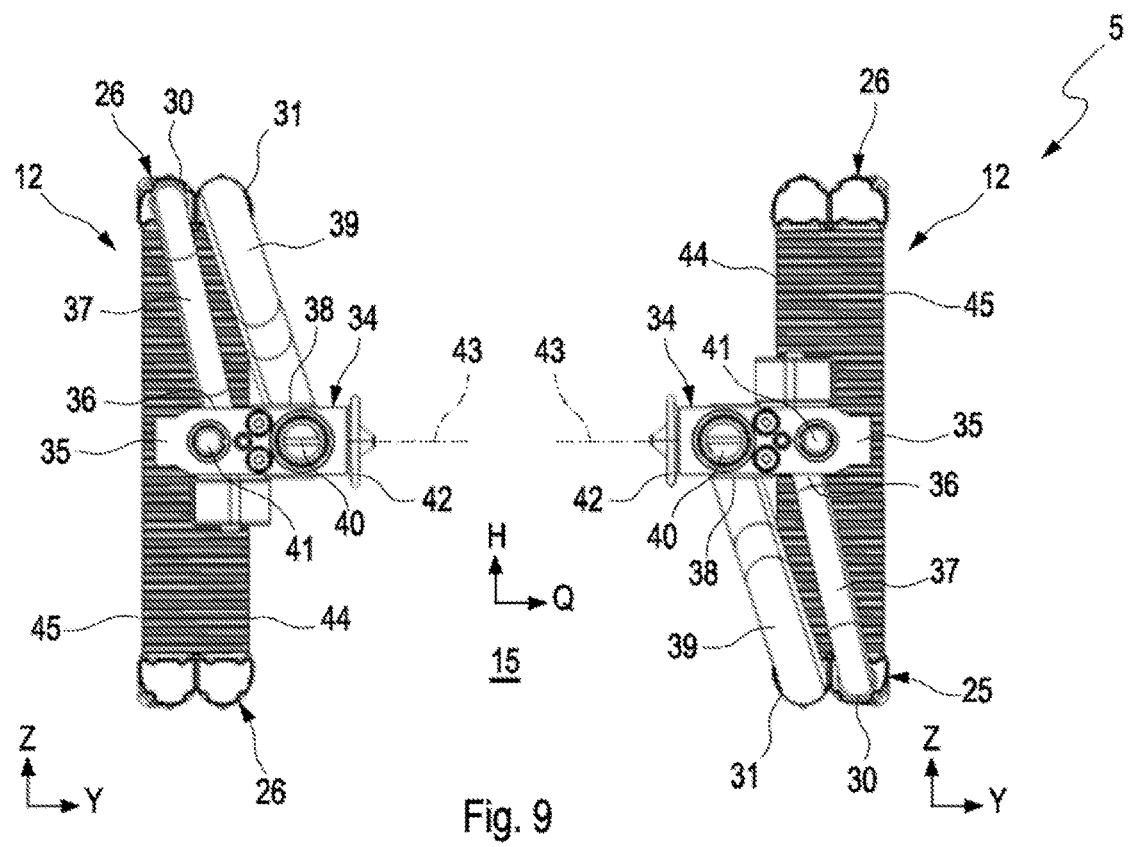

FIGS. 7 to 9 show a second embodiment, in which the two evaporators 12 are arranged turned to one another about the longitudinal axis L of the evaporator unit 5. The turning is likewise achieved in the examples shown in that the two evaporators 12 are arranged turned to one another about said longitudinal axis L through approximately 180°. Consequently, the inlet connectors 30 and the outlet connectors 31 of the two evaporators 12 are arranged with respect to the vertical axis H, which in FIGS. 7 and 8 again stands perpendicularly on the plane of the drawing, at different ends of the evaporators 12, whereas with respect to the longitudinal axis L they are arranged respectively at the same end of the evaporators 12. For example, in FIGS. 7 and 8 the connectors 30, 31 in the case of the evaporator 12 shown on the left are situated respectively at the lower end of the evaporator 12 facing away from the observer, whereas in the case of the evaporator 12 shown on the right, they are situated at the upper end of the evaporator 12 facing the observer. This can be seen better in FIG. 9. In addition, these connectors 31, 31 for inlet and outlet of the refrigerant are situated respectively on the same side of the two evaporators 12 or respectively on the same side of the evaporator unit 5. Hereby, the previously mentioned coupling 33 for integrating the two evaporators 12 into the refrigeration circuit is simplified.

In the embodiment shown in FIG. 7, the axes Z, Y; Z of the evaporators 12 are again aligned parallel to the axes L, Q and H of the evaporator unit 5.

In the embodiment shown in FIG. 8, the two evaporators 12 are again turned about their Z axis Z with respect to the evaporator unit 5, so that an inclination angle occurs between the X axes X and the longitudinal axis L on the one hand and between the Y axes Y and the transverse axis Q on the other hand. The Z axes Z, in contrast, are again parallel to the vertical axis H.

In the examples shown here, each evaporator 12 has its own or respectively a separate expansion valve 34, which is described in further detail with regard to FIG. 9. Basically, however, the expansion valve 34 can have the same structure in all the embodiments shown here. The expansion valve 34 possesses a housing 35 and has a liquid connector 36 which is fluidically connected via an inlet line 37 to the inlet connector 30 of the respective evaporator 12. In addition, the expansion valve 34 has a gas connector 38, which is fluidically connected via an outlet line 39 to the outlet connector 31 of the respective evaporator 12. Furthermore, the expansion valve has a condenser connector 40, which is connected finally to the condenser 17 via a corresponding line, not shown here. In addition, the expansion valve 34 has a compressor connector 41, which is connected via a pressure line, not shown here, to a pressure side of a compressor, likewise not shown, of the rooftop air-conditioning system 2. The suction side of the compressor is connected to the condenser 17. Said compressor can be accommodated for example in the condenser unit 6 or likewise in the evaporator unit 5.

The expansion valve 34 has, furthermore, a control head 42, which controls the inflow of liquid refrigerant to the evaporator 12. The control head 42 is arranged, with respect to a longitudinal direction 43 of the expansion valve 34, on the face side on the valve housing 35. The liquid connector 36 and the gas connector 38 are arranged adjacent to one another in this longitudinal direction 43 on the valve housing 35. Accordingly, the condenser connector 40 and the compressor connector 41 are also arranged adjacent to one another in the longitudinal direction 43 of the valve housing 35. In the second embodiment shown in FIGS. 7 to 9, the expansion valve 34 is arranged spatially so that its longitudinal direction 43 forms an angle of 90° with respect to the vertical axis H. In the embodiments of FIGS. 4 to 6, on the other hand, an inclination of the longitudinal direction 43 with respect to the vertical axis H is provided, which can lie in a range of 0° to 90°. It is important here that the control head 42 in the installed state is arranged above, when the expansion valve 34 is inclined as regards its longitudinal direction 43 with respect to the vertical axis H. Preferably, the evaporators 12 form jointly with the associated expansion valve 34 an assembly which is able to be pre-assembled. Here, by means of inlet lines 37 and outlet lines 39 of metal, in addition a desired positioning of the expansion valve 34 relative to the evaporator 12 can be ensured.

Basically, according to FIG. 9 the respective expansion valve 34 can be arranged approximately centrally with respect to the Z axis Z of the respective evaporator 12, which improves the ability to be turned about the longitudinal axis L. In addition, provision is made here that the respective expansion valve 34 in the transverse axis Q projects over the associated evaporator 12 exclusively on the inflow side 47 facing the intake chamber 15. In addition, provision is made here that at the respective evaporator 12 the inlet line 37 and the outlet line 39 extend in an inclined manner with respect to the Z axis Z of the respective evaporator 12. Specifically, provision is made that the inlet line 37 and the outlet line 39 are inclined with respect to the Z axis Z of the respective evaporator 12 so that the associated expansion valve 34 at the respective evaporator 12 is arranged offset in the direction to the inflow side of the respective evaporator 12. Furthermore, provision is made here that the respective expansion valve 34 is aligned with its longitudinal axis 43 approximately parallel to the transverse direction Q.

With reference to FIG. 3, a particularly advantageous configuration of the respective evaporator 12 is explained in further detail below. Accordingly, the respective evaporator 12 has a row 44, on the inflow side, of evaporation pipes 24, which are arranged adjacent to one another in the X axis X, and a row 45, on the outflow side, of evaporation pipes 24, which are likewise arranged adjacent to one another in the X axis X. The evaporation pipes 24 of the row 44 on the inflow side and the evaporation pipes 44 of the row 45 on the outflow side are arranged adjacent to one another in the Y axis Y. Accordingly, the row 44 on the inflow side in FIG. 3 is situated on the side of the evaporator 12 facing away from the observer, whereas the row 45 on the outflow side is situated on the side facing the observer. Accordingly, the row 44 on the inflow side is firstly flowed against and flowed through by the air flow 28, whereas the row 45 on the outflow side is only flowed through thereafter by the air flow 28. In the installed state, the row 44 on the inflow side faces the intake chamber 15, whereas the row 45 on the outflow side faces away from the intake chamber 15. Furthermore, it is noteworthy that the row 45 on the outflow side is connected to the inlet connector 40 and is accordingly supplied with the liquid, cold refrigerant. In contrast thereto, the row 44 on the inflow side is connected to the outlet connector 31, so that the heated, gaseous refrigerant exits from the row 44 on the inflow side.

In addition, provision is made according to FIG. 3 to divide the row 44 on the inflow side and the row 45 on the outflow side in the X axis respectively into three groups 46, wherein in each group 46 multiple evaporation pipes 24 are arranged adjacent to one another in the X axis X. The individual groups 46 of the row 44 on the inflow side and of the row 45 on the outflow side are connected to one another by means of the chambers 27, mentioned further above, which are formed in the distributor- and collector box 25 and in the diverting box 26, so that the following through-flow of the condenser 12 arises. Through the inlet connector 30, the liquid refrigerant within the row 45 on the outflow side arrives into the first group 46, connected to the inlet connector 30, of the side 45 on the outflow side. As in FIG. 3 the distributor- and collector box 25 is arranged below, the refrigerant flows in this first group 46 of the row 45 on the outflow side firstly upwards into the diverting box 26. In a corresponding chamber 27, the diverting takes place in the diverting box 26 to the second or central group 46 of the row 45 on the outflow side, in which the coolant then flows downwards. In a corresponding chamber 27 of the distributor- and collector box 25, the refrigerant is then delivered to the third and last group 46 of the row 45 on the outflow side, in which the refrigerant then flows upward again to the diverting box 26. In a corresponding chamber 27, the refrigerant in the diverting box 26 is then delivered to the first group 46 of the row 44 on the inflow side, in which the refrigerant then flows again downwards to the distributor- and collector box 25. In a further chamber 27, the diverting takes place there into the second or central group 46 of the row 44 on the inflow side, in which the refrigerant then flows again upwards to the diverting box 26. In a further chamber 27, in the diverting box 26 the diverting takes place to the third and last group 46 of the row 44 on the inflow side, in which the by now gaseous refrigerant flows in the direction of the distributor- and collector box 45. As the last group 46 of the row on the inflow side is connected to the outlet connector 31, the gaseous refrigerant then flows via a further chamber 27 of the distributor- and collector box 25 out from the evaporator 12.

In summary, therefore, the row 45 on the outflow side and the row 44 on the inflow side are flowed through by refrigerant in series, therefore one after the other. Within the respective row 44, 45 the groups 46 are flowed through by the refrigerant in series, therefore one after the other. Within the respective group 46, the evaporation pipes 24 are flowed through by the refrigerant in a parallel manner, therefore simultaneously. The arrangement shown here is preferred, in which the two evaporators 12 are flowed through by the air flow 28 and by the refrigerant respectively by the cross counter-flow principle.

The invention claimed is:

1. An evaporator unit for a rooftop air-conditioning system of a road-going vehicle comprising:
    a housing having two evaporators, wherein each of the two evaporators has a plurality of evaporation pipes running parallel to one another and parallel to a Z axis of the respective evaporator, a distributor and collector box running parallel to a X axis of the respective evaporator, and a diverting box running parallel to the X axis of the respective evaporator;
    wherein the plurality of evaporation pipes extend from the distributor and collector box to the diverting box;
    wherein the distributor and collector box has an inlet connector for liquid refrigerant and an outlet connector for gaseous refrigerant disposed adjacent to one another on a same face side of the distributor and collector box and in a Y axis of the respective evaporator;
    wherein the two evaporators are disposed on a first side and a second side of an intake chamber of the evaporator unit and lying opposite one another in a transverse axis of the evaporator unit;
    wherein the two evaporators are structurally identical; and
    wherein the two evaporators are turned toward one another about a longitudinal axis of the evaporator unit, so that the inlet connectors and the outlet connectors of the two evaporators i) are disposed, with respect to a vertical axis of the evaporator unit, at different ends of the two evaporators and ii) are situated, with respect to the longitudinal axis, at the same end of the two evaporators.

2. The evaporator unit according to claim 1, wherein the two evaporators include a shared expansion valve having i) a liquid connector connected via a plurality of inlet lines to each of the inlet connectors of the two evaporators, and ii) a gas connector connected via a plurality of outlet lines to each of the outlet connectors of the two evaporators.

3. The evaporator unit according to claim 1, wherein the two evaporators are turned toward one another about the longitudinal axis approximately 180°.

4. The evaporator unit according to claim 1, wherein the two evaporators are aligned with the Z axis of the two evaporators respectively extending approximately parallel to the vertical axis.

5. The evaporator unit according to claim 1, wherein the two evaporators are disposed with the X axis of each of the two evaporators respectively inclined to a longitudinal axis of the evaporator unit.

6. The evaporator unit according to claim 1, wherein
    the respective evaporator of the two evaporators includes a row of the plurality of evaporator pipes on an inflow side, disposed adjacent to one another in the X axis, and a row of the plurality of evaporator pipes on an outflow side, disposed adjacent to one another in the X axis,
    the row on the inflow side and the row on the outflow side are disposed adjacent to one another in the Y axis, and
    the row on the inflow side faces the intake chamber, and the row on the outflow side faces away from the intake chamber.

7. The evaporator unit according to claim 6, wherein
    the row on the inflow side and the row on the outflow side are divided in the X axis respectively into at least two groups having respectively a plurality of evaporation pipes disposed adjacent to one another in the X axis, and
    the at least two groups are connected to one another via a plurality of chambers defined in the distributor and collector box and in the diverting box so that a refrigerant first flows within the row on the outflow side from a first group of the at least two groups, connected to the inlet connector, of the row on the outflow side, up to a last group of the at least two groups of the row on the outflow side, and then flows within the row on the inflow side from a first group of the at least two groups of the row on the inflow side up to a last group of the at least two groups, connected to the outlet connector, of the row on the inflow side.

8. The evaporator unit according to claim 6, wherein the row on the outflow side is connected to the inlet connector, and the row on the inflow side is connected to the outlet connector.

9. The evaporator unit according to claim 1, wherein each of the two evaporators includes a separate expansion valve having a liquid connector connected via an inlet line to the inlet connector of the respective evaporator of the two evaporators, and a gas connector connected via an outlet line to the outlet connector of the respective evaporator of the two evaporators.

10. The evaporator unit according to claim 9, wherein the respective expansion valve of the two evaporators is arranged such that a longitudinal axis of the respective expansion valve extends substantially parallel to the transverse axis.

11. The evaporator unit according to claim 9, wherein
the respective expansion valve of the two evaporators includes a valve housing and a control head disposed, with respect to a longitudinal direction of the respective expansion valve, on a face side of the valve housing,
the liquid connector and the gas connector are disposed on the valve housing adjacent to one another in the longitudinal direction of the respective expansion valve, and
the longitudinal direction of the respective expansion valve is inclined by 90° or less with respect to a vertical axis of the evaporator unit.

12. The evaporator unit according to claim 9, wherein the inlet line and the outlet line consist of metal, and position the respective expansion valve relative to the respective evaporator of the two evaporators.

13. The evaporator unit according to claim 9, wherein the respective expansion valve of the two evaporators is disposed substantially centrally with respect to the Z axis of the respective evaporator of the two evaporators.

14. The evaporator unit according to claim 13, wherein the respective expansion valve of the two evaporators projects in the transverse axis over the associated evaporator of the two evaporators exclusively on an inflow side facing the intake chamber.

15. The evaporator unit according to claim 13, wherein at the respective evaporator of the two evaporators, the inlet line and the outlet line extend at an incline with respect to the Z axis of the respective evaporator of the two evaporators.

16. The evaporator unit according to claim 15, wherein the inlet line and the outlet line are inclined with respect to the Z axis of the respective evaporator of the two evaporators so that the associated expansion valve at the respective evaporator of the two evaporators is disposed offset in a direction to an inflow side of the respective evaporator of the two evaporators.

17. An evaporator unit for a rooftop air-conditioning system of a road-going vehicle, comprising:
a housing having two evaporators, wherein each of the two evaporators has a plurality of evaporation pipes running parallel to one another and parallel to a Z axis of the respective evaporator, a distributor and collector box running parallel to a X axis of the respective evaporator, and a diverting box running parallel to the X axis of the respective evaporator;
wherein the plurality of evaporation pipes extend from the distributor and collector box to the diverting box;
wherein the distributor and collector box has an inlet connector for liquid refrigerant and an outlet connector for gaseous refrigerant disposed adjacent to one another on a same face side of the distributor and collector box and in a Y axis of the respective evaporator;
wherein the two evaporators are disposed on a first side and a second side of an intake chamber of the evaporator unit and lying opposite one another in a transverse axis of the evaporator unit;
wherein the two evaporators are substantially identical; and
wherein the two evaporators are turned toward one another about a vertical axis of the evaporator unit, so that the inlet connectors and the outlet connectors of the two evaporators i) are disposed, with respect to the vertical axis of the evaporator unit, at the same end of the two evaporators and ii) are disposed, with respect to a longitudinal axis of the evaporator unit, at different ends of the two evaporators.

18. The evaporator unit according to claim 17, wherein the two evaporators are turned toward one another about the vertical axis approximately 180°.

19. The evaporator unit according to claim 17, wherein the two evaporators are arranged such that the Z axis of each of the two evaporators extends at an incline with respect to the vertical axis.

20. A rooftop air-conditioning system for a road-going vehicle, comprising: an evaporator unit including a housing having two evaporators, wherein each of the two evaporators has a plurality of evaporation pipes running parallel to one another and parallel to a Z axis of the respective evaporator, a distributor and collector box running parallel to a X axis of the respective evaporator, and a diverting box running parallel to the X axis of the respective evaporator;
wherein the plurality of evaporation pipes extend from the distributor and collector box to the diverting box;
wherein the distributor and collector box has an inlet connector for liquid refrigerant and an outlet connector for gaseous refrigerant disposed adjacent to one another on a same face side of the distributor and collector box and in a Y axis of the respective evaporator;
wherein the two evaporators are disposed on a first side and a second side of an intake chamber of the evaporator unit and lying opposite one another in a transverse axis of the evaporator unit;
wherein the two evaporators are structurally identical;
wherein the two evaporators are integrated into a refrigeration circuit; and
wherein the two evaporators are turned toward one another about a longitudinal axis of the evaporator unit, so that the inlet connectors and the outlet connectors of the two evaporators i) are disposed, with respect to a vertical axis of the evaporator unit, at different ends of the two evaporators and ii) are situated, with respect to the longitudinal axis, at the same end of the two evaporators.

* * * * *